United States Patent [19]
Schutten et al.

[11] Patent Number: 4,967,362
[45] Date of Patent: Oct. 30, 1990

[54] AUTOMATIC STEERING APPARATUS FOR CROP VEHICLE

[75] Inventors: Herman P. Schutten, Bayside, Wis.; Dwight B. Stephenson, Savage; Oliver W. Johnson, Chaska, both of Minn.

[73] Assignee: Eaton Corporation, Cleveland, Ohio

[21] Appl. No.: 302,889

[22] Filed: Jan. 30, 1989

[51] Int. Cl.⁵ .................. G06F 15/50; A01D 34/00
[52] U.S. Cl. ........................... 364/424.07; 56/10.2
[58] Field of Search ................ 364/424.01, 424.02, 364/424.07; 56/DIG. 15, 10.2; 180/131

[56] References Cited

U.S. PATENT DOCUMENTS

| | | | |
|---|---|---|---|
| 4,126,984 | 11/1978 | Gail | 56/10.2 |
| 4,197,690 | 4/1980 | Eistert et al. | 56/10.2 |
| 4,295,323 | 10/1981 | Maier et al. | 56/10.2 |
| 4,304,316 | 12/1981 | Lang | 180/131 |
| 4,428,449 | 1/1984 | Lang | 180/131 |
| 4,505,044 | 3/1985 | Demorest | 56/10.2 |
| 4,528,804 | 7/1985 | Williams | 56/10.2 |
| 4,777,785 | 10/1988 | Rafaels | 56/10.2 |

*Primary Examiner*—Thomas G. Black
*Attorney, Agent, or Firm*—C. H. Grace

[57] ABSTRACT

Apparatus for automatically steering a farm crop vehicle into rows of corn by sensing the locations of the rows ahead of the vehicle on both sides of the vehicle. The apparatus senses the plants of each row by means of contact sensors that touch the plants as the crop vehicle approaches them. The data thus obtained are processed by an on-board microcontroller to determine the lateral location of the crop vehicle relative to the rows. Also, the frequencies of encountering plants in laterally spaced-apart rows provided information regarding turning of the vehicle, i.e., incipient changes of lateral position. This is used to produce a further feedback signal that improves the automatic steering, especially where the rows are curved. Having the turning-feedback signal in the servo loop also permits higher loop gain without instability, which reduces tracking error even further. The microcontroller provides steering commands that automatically maintain the crop vehicle on a proper course for stripping the corn, cutting the crop, etc. The control system also provides indications for the operator of single row dropout, vehicle out of field, and field entry.

12 Claims, 5 Drawing Sheets

AUTOMATIC STEERING APPARATUS FOR CROP VEHICLE

FIELD AND BACKGROUND OF THE INVENTION

1. Field

The invention relates to harvesting of crops that are planted in rows, such as corn and soybeans. A vehicle is steered automatically by sensing the locations of the rows of plants. Typically, corn is planted with a predetermined spacing of from 6 inches to 14 inches, in rows about 2½ feet apart. When the plants are harvested, the vehicle travels in a direction longitudinal of the rows of corn, automatically senses the lateral locations of the rows, and utilizes the information for fully-automatic steering or manually-assisted automatic steering.

Reference is made to a co-pending application by the inventors of this application, and presently assigned to the same assignee. It is: "Automatic Steering Apparatus Using Reflected Signals", Ser. No. 313,644, filed Feb. 21, 1989, inventors H. P. Schutten, D. B. Stephenson, and O. W. Johnson.

2. Background

Crop vehicles of this type commonly harvest twelve rows of plants simultaneously. As the vehicle moves forward the plants in the rows are guided by twelve V-shaped guides at the front of the vehicle. The V-shaped guides shepherd the flexible plants into stripping or cutting bars mounted on the crop vehicle, where the ears of corn are stripped from their stalks or the plants are severed. The V-shaped guides are typically about five feet long, and their forward tips are about 2½ feet apart. The front of at least one of the V-guides is equipped with a pair of plant-contact sensors. These feeler-type sensors are contacted by the corn plants as they enter the V-guide. The sensors provide electrical signals that assist in the steering of the crop vehicle.

An example of only one of many prior art systems is a system that can automatically assist the steering well enough to harvest corn satisfactorily from straight rows of plants, but is unable to steer automatically very accurately where the rows are curved. For steering purposes that particular prior art system relies upon information as to which of two plant-contacting sensors (the right-hand sensor or the left-hand sensor), at the front of the same V-guide is deflected by the corn plants.

The reason that the vehicle does not automatically follow curved rows of plants very well is that a relatively large error (i.e., lateral offset of the vehicle from the optimum travel path) has to develop before a sufficient corrective steering command is produced. This cannot be corrected by merely designing the closed feedback loop with higher gain, because the system then becomes unstable. Even when the feedback loop has the maximum gain that is practical in that prior system the vehicle tracks very poorly around turns.

In such a prior art system the accuracy of steering around curves cannot be improved by merely providing an integral feedback term in the steering control system because there would be too much delay both in build-up of the integral bias to produce an adequate steering control signal and in reduction of the integral bias after the crop vehicle comes out of the turn. To improve its steering, the prior system being described employs a bias signal that is controlled manually. When the vehicle enters a turn the operator is required to turn a knob to add enough bias signal to keep the crop vehicle lined up with the rows of crop. Needless to say it is inconvenient for the operator to have to assist the automatic steering system in this way.

SUMMARY

Problem Solved By the Invention

As a guided harvesting vehicle drives along parallel to the crop rows it may get slightly off the optimum path (in which the V-guides would be centered laterally on the rows) and headed in a slightly incorrect direction. The problems of automatic guidance are (a) to sense the present locations of the rows relative to the vehicle and to anticipate the future locations; (b) to determine by algorithms the best direction for the steerable wheel at that moment to place the vehicle on the optimum path with the proper heading as quickly as possible (without swerving); (c) to supply control signals and an actuator to accomplish that steering; (d) to provide high-enough loop gain to keep the vehicle tracking the rows with only a small error at most, and (e) to provide alarm outputs for the attention of the operator.

General Approach

The invention described herein senses the geometry of the vehicle's situation, turns the wheels in the direction of the optimum path, and turns them back upon reaching or shortly before reaching the optimum path, as sharply as is appropriate to get on the optimum path.

The invented apparatus is a "plant-contacting" type of guidance system; the name refers to the means of sensing the location, speed, and rotation of the vehicle. The following brief overview of what the guidance system does applies to both straight and curved segments of the crop rows.

(a) It ascertains the lateral position of the vehicle relative to the crop rows by obtaining relative lateral-position data from plant-contact sensors on two or more of its V-guides.

(b) It anticipates changes in the vehicle's near-future position relative to the rows by ascertaining the velocity and the rate of change of heading of the vehicle relative to the rows. This is accomplished by measuring the frequency of contacting plants, and the frequency difference of contacting plants of a left-hand row relative to a right-hand row, based upon information from the plant-contact sensors on the left and right V-guides.

DESCRIPTION

Vehicle and Crop Rows

Figure 1:
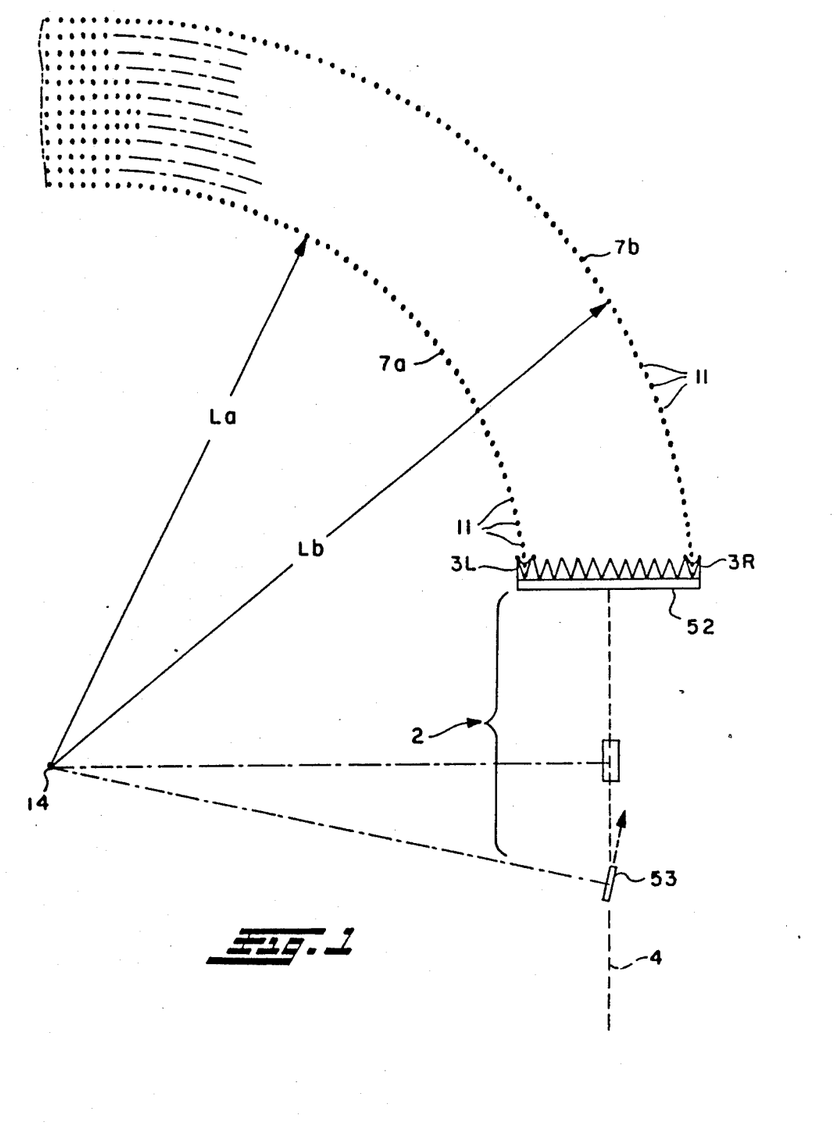
FIG. 1 is a simplified diagram of a crop vehicle as it approaches a turn in rows of plants that it is harvesting.

FIG. 1 shows a corn harvesting crop vehicle 2 traveling on an optimum path 4 toward twelve rows, 7a to 7b, of corn plants 11 extending from the left side 3L of the vehicle's harvesting attachment to its right side 3R. The rows are straight for a part of their path on the lower half of FIG. 1 and are curved to the left on the upper half of FIG. 1. The crop vehicle 2 has a steerable rear wheel 53 that is controlled by a hydraulic steering cylinder 56 (shown elsewhere). Although the centers of curvature of the left and right rows may not precisely coincide or be stationary, a point 14 is denoted as an approximate center of curvature of both. FIG. 1 also symbolically indicates a mechanism 52 which strips the ears of corn from the stalks when they arrive at it.

V-Guides and Sensors

Figure 2:
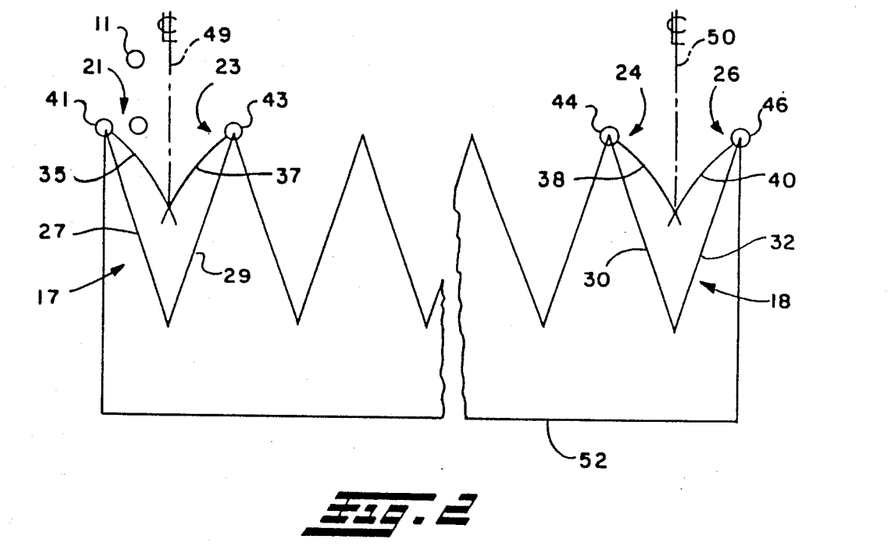
FIG. 2 is a simplified diagram of V-guides and contact sensors on a crop vehicle equipped with a preferred embodiment of the invention.

V-guides (one for each of the twelve rows), are mounted on the crop vehicle 2, as shown in FIGS. 1 and 2. The extreme left-hand and right-hand V-guides are numbered 17 and 18. FIG. 2 shows contact-type plant sensors 21, 23, which are provided on each leg 27, 29 of the extreme left V-guide 17; similar sensors 24, 26 are on the legs 30, 32 of the extreme right V-guide 18. The plant sensors in this particular embodiment utilize spring-loaded potentiometers 41, 43, 44, 46 mounted on the left and right forward tips of the V-guides 17, 18. A contact arm 35, 37, 38, 40 two feet long extends from each potentiometer toward and past the centerline 49, 50 of its V-guide. The contact arms are slightly curved and pointed backward so that a pair of them forms a shallow X shape. When they encounter corn plants they are deflected backward, rotating the potentiometer shafts to which they are connected.

When a plant 11 deflects the contact-sensor arm 35, a change in resistance of the energized potentiometer 41 provides a signal indicating the presence and approximate relative lateral position of the plant 11. Deflection signals from potentiometers 41, 43, 44, 46 and related apparatus are denoted $L_L$, $L_R$, $R_L$, and $R_R$ respectively.

Signal Processing and Automatic Control

The potentiometer signals are processed by simple routine signal-processing circuits 59, 61, 62, 64 (FIG. 3), to put them in forms which are acceptable as input data to a microcontroller 66. Within circuit 59, the deflection signal due to each plant is converted to a pulse of standardized amplitude and duration by a conventional threshold device 100 that ignores low-level noise, and a pulse train $L_L$ is output from circuit 59 to the microcontroller 66. Similarly, circuits 61, 62, and 64 send pulse trains $L_R$, $R_L$, and $R_R$ to the microcontroller.

Figure 3:
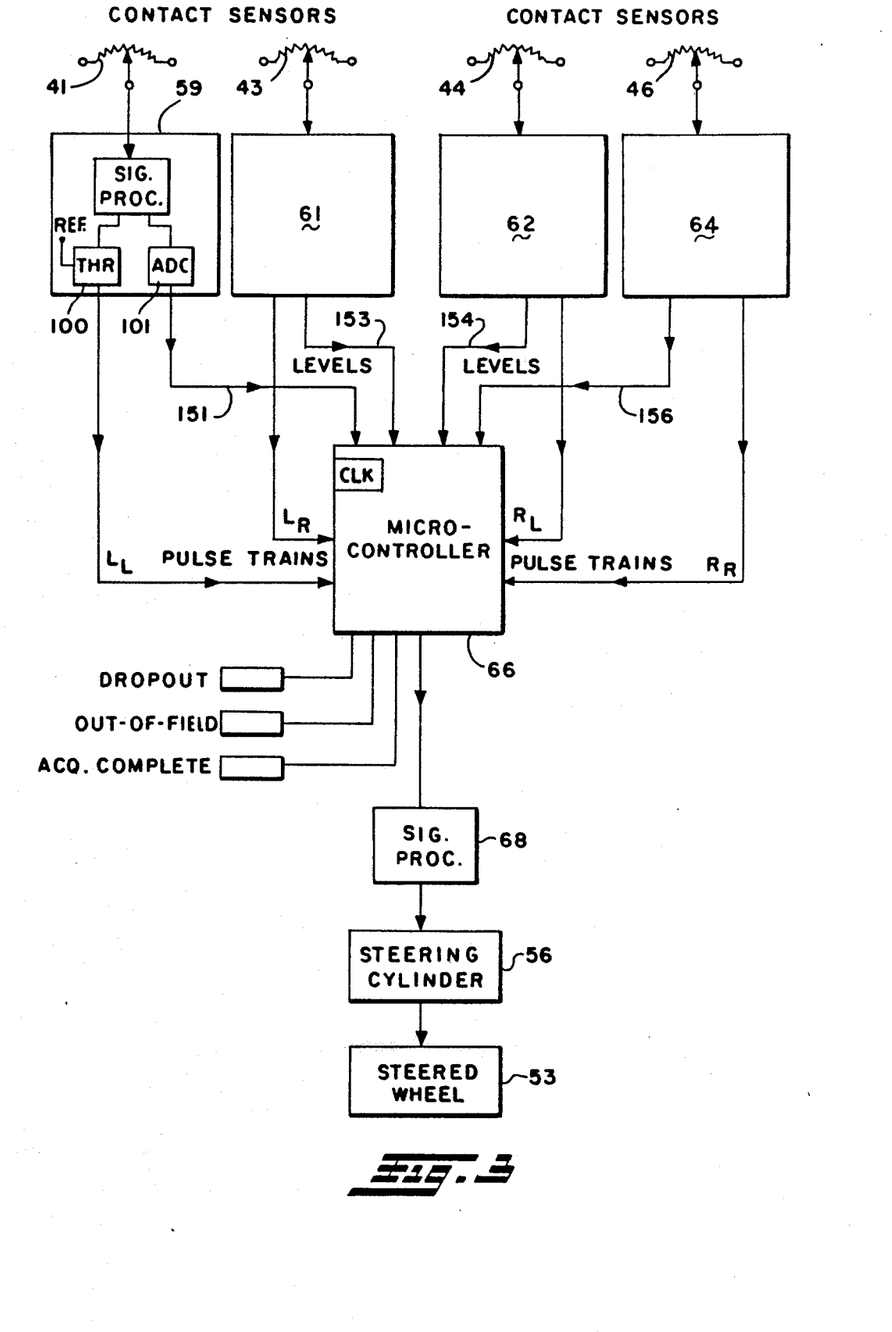
FIG. 3 is a block diagram of major components and signal flow among them for automatic guidance of the crop vehicle.

The peak amount or level of each deflection of a sensor is converted to a digital signal in an analog-to-digital converter such as ADC 101 and transmitted from circuits 59, 61, 62, 64 to microcontroller 66 on lines 151, 153, 154, and 156 respectively. The transmitted level data are referred to as $L_L$-level, $L_R$-level, $R_L$-level, and $R_R$-level.

The data are then processed and interpreted by the microcontroller 66. The microcontroller converts the error signals to commands for the vehicle 2 to steer left or right as necessary to keep the V-guides 17, 18 centered laterally on the two rows 7a, 7b of corn. The microcontroller includes a clock oscillator that enables it to ascertain the time between occurrences of plant-contact pulses.

One contact sensor alone, such as sensor 21, would be able to sense a left or right deviation of the vehicle from an optimum path; the four contact sensors of this apparatus provide redundant lateral-position data that are combined in the microcontroller, preferably by averaging, but alternatively by selection, to improve steering accuracy. The four sensors also provide information about the frequency of plant contacts that is used in ways described below.

The microcontroller 66 outputs control commands to a circuit 68, which processes and amplifies them, and provides them to the steering cylinder 56 and its associated control equipment as in the prior art. In response, the steering cylinder 56 steers the wheel 53 in such a direction as to center the crop rows in the V-guides, thereby reducing the error signals, as is ordinarily done in negative-feedback closed-loop servomechanisms.

Information Received From The Contact Sensors

Each contact sensor such as sensor 21 is employed to obtain two types of information, (a) Lateral Position Information, and (b) Plant Frequency Information (FIG. 4), both of which will now be described in more detail.

Figure 4:
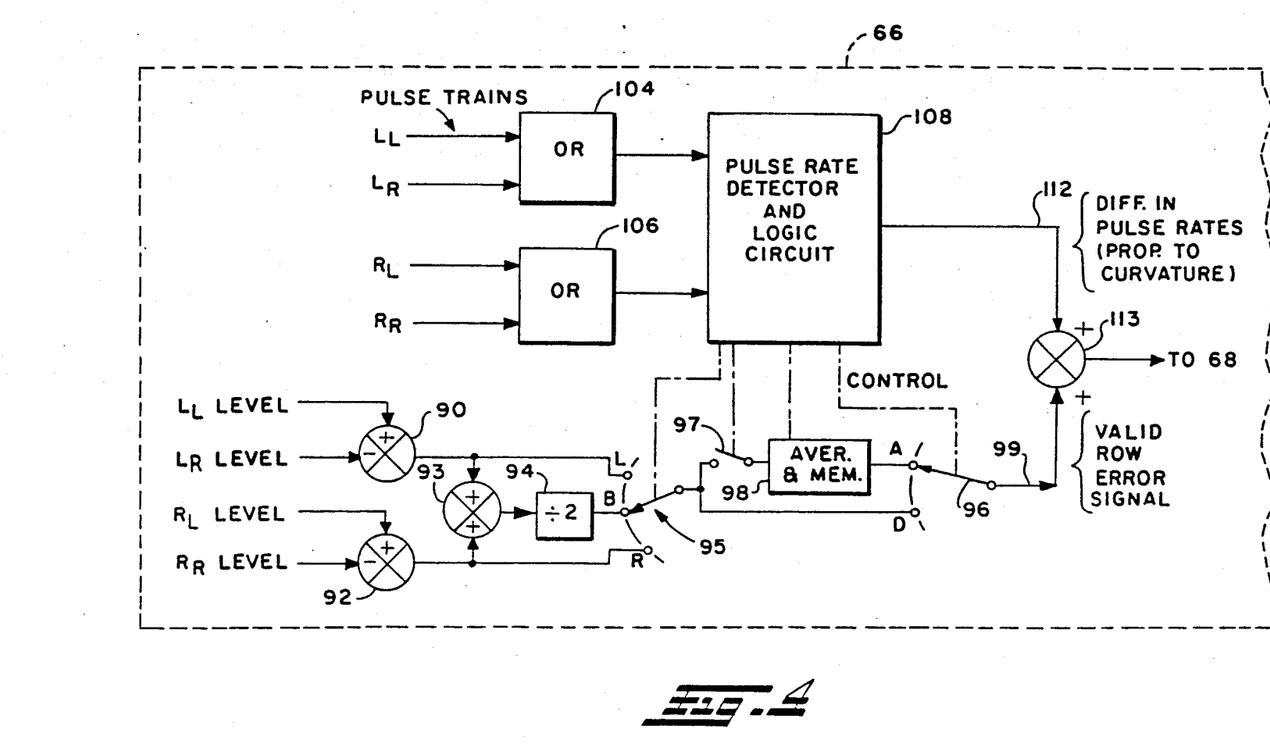
FIG. 4 is a block diagram of portions of electronic equipment for processing signals received from V-guide sensors for guidance of the crop vehicle while it is operating in a field.

(a) Lateral-Position Information. This indicates the approximate lateral position (relative to the vehicle) of each plant that deflects a contact sensor. When the vehicle starts to diverge from the optimum path 4, quantitative signals ("level" signals) from the V-guide's contact sensors 21, etc. provide Lateral-Position Information. FIG. 4 illustrates (in analog format for clarity), the relevant digital functions that are performed by the microcomputer 66 on this information. The difference between magnitudes of the $L_L$ and $L_R$ signal levels is taken at a subtractor 90, and the difference between magnitudes of the $R_L$ and $R_R$ signal levels is taken at a subtractor 92.

The two differences are averaged by adding them at 93 and dividing by two at 94. Alternatively, one or the other of the differences can be selected, as indicated symbolically by a three-position switch 95 on FIG. 4. Switch position L has the left-hand difference level; position R has the right-hand difference level, and position B has both the left and right (average). The selector switch 95 is controlled by logic in the pulse rate detector 108 in dependence upon whether the left sensors or the right sensors or both are detecting plants and therefore producing pulse trains; (it is in position L, R, or B respectively).

The selected level-signal difference at the output of switch 95 is connected directly to one pole D of a two-position "selector switch" 96, and is also passed through a single-pole switch 97 to a running-averaging shift register 98. The switch 97 is closed by action of pulse detector 108 whenever pulses are present at the left (104), the right (106), or both channels. All of the logic functions of block 108 can be performed in any of several simple ways by routine programming of the microprocessor 66, using techniques that are well known in the prior art.

The pulse rate detector 108 also controls the averaging circuit and memory 98, (which serves as a low-pass filter and memory). Block 98 constantly computes a running average of level signals and stores and outputs its most recent running average. It is a shift register whose individual stage contents are averaged, to provide a single output. When the pulse detector 108 senses that the pulses have stopped altogether, signifying that no plants are being encountered, the detector 108 operates the switch 96 to position A. That places the averaging and memory device 98 in the circuit, which outputs its stored average information to enable the automatic steering system to keep the harvester on a recent-average course.

The switch 96 is controlled by the pulse rate detector and logic circuit 108. Switch 96 selects the output of the register 98 (at the A position of switch 96) when all trains of pulses are absent, and selects the output of switch 95 (at the D position of switch 96) when any pulse train or trains whatsoever are being received by the detector 108.

The row-error signal at terminal 99, which is the output of switch 96, is indicative of the lateral deviation of the vehicle from the optimum path.

(b) Plant Frequency Information. This discloses the frequency with which the contact sensors 21, etc. encounter plants, (which is readily determined from the times of their successive deflections), and is therefore proportional to the forward speed of the side of the vehicle on which the sensor is mounted. In this way the lineal velocities of the vehicle at both the right-hand and left-hand rows are sensed by the contact sensors (the Frequency Information) in the embodiment being described.

In FIGS. 3 and 4 the occurrence of any level of deflection signal above a noise threshold is interpreted as a plant-contact event by the threshold device 100. The presence of either a pulse signal $L_L$ or a pulse signal $L_R$ results in an event signal at the output of an OR logic device 104, which signifies that a plant of row 7a has been detected at the left-hand V-guide 17. Similarly the arrival of the right-hand V-guide 18 at a plant in row 7b results in an event signal at the output of an OR gate 106.

Averaging of Plant Spacings

Ordinarily corn is rather precisely positioned at its base during planting, but it may grow crookedly and therefore, at the height of the sensors 21, etc., be off-center by several inches. This causes variations in the times of encountering them, and therefore variations in velocity data (spacing data). The number of plant spacings that must be averaged before their average spacing data is within a desired accuracy, for example, within 95 percent of the true base spacing, is the necessary sample size.

If the necessary sample size is, for example, ten spacings, then spacing values are loaded sequentially into a ten-stage shift register in block 108. If desired the spacings can be represented by the time intervals between plant encounters. The simultaneous data contents of the ten stages are added to provide an output signal proportional to the average of those ten spacings. When the next-occurring spacing value is entered, the oldest one is dropped, so the circuit outputs a running average of spacings.

Plant Spacing At Turns

Ideally if the plants of the row being sensed by the left-hand sensors are 10 inches apart, the plants of the row being sensed by the right-hand sensors would also be 10 inches apart. Actually corn is often planted in banks (small groups) of rows, with the plant spacing cycle under the control of a ground-contacting wheel. The plants of all of the rows of one planting bank are planted in the same ground-contacting-wheel cycle even when the planting vehicle is on a turn. There might be several banks within the span of rows 7a to 7b of a 12-row harvester.

During harvesting, on a left turn the left-hand sensors encounter plants that were planted by a bank of row planters that was turning with a relatively small radius and the right-hand sensors encounter plants that were planted by a different bank of row planters that was turning with a relatively large radius (FIG. 1). The right side of the vehicle is traveling faster than the left, so the right-hand sensors encounter plants much more frequently than the left-hand sensors do. Although the frequency is only approximately proportion to turning radius, the measurement is good enough for the control purposes of this invention.

Turning Feedback

A frequency-difference signal is provided, based on the difference in the velocities at the left- and right-hand sides of the vehicle. The rate of change of lateral offset error signal is not directly measured; instead, the difference in velocities of different points on the vehicle is measured. It indicates the actual rate of change of direction of the vehicle. This information is used by the microcontroller to improve the automatically-assisted steering of the vehicle.

The frequency-difference signal is provided in the following way. In FIG. 4, the rate of arrival of pulses received at the rate detector 108 from OR 9ate 106 is subtracted from the rate of arrival of pulses received at 10B from OR gate 104. The output 112 of block 108 is a pulse rate difference, which is roughly proportional to the curvature of the center row of the group of rows that the vehicle is harvesting, i.e., of the path 4. The curvature signal at terminal 112 from block 108 is injected as a turning rate signal into the steering servomechanism loop of FIG. 3 by simply adding it to the lateral offset error signal of terminal 99 in an adder 113, as shown on FIG. 4. The output of adder 113 is a turning-feedback-corrected signal.

Routine System Operation With Turning Feedback

It is on curved portions of the plant rows that the greatest deviations would occur if the V-guide's lateral position error signals alone were relied upon for automatic steering. At the top of FIG. 1 the rows of corn turn to the left. To follow the rows, the turning of the vehicle is started and controlled primarily by the lateral position error signals, and is assisted by a turning-feedback signal. When the vehicle is making this turn, its left side is traveling slower than its right side. As a first approximation, the angular velocity of the left side, reckoned about the instantaneous imaginary center 14, is taken tp be approximately the same as the angular velocity of the right side, (point 14 is taken to be approximately on an imaginary line extended laterally through the sensors).

The lineal velocities of the left and right sides of the vehicle are approximately proportional to their respective turning radii La and Lb. The difference in frequencies of encountering plants on rows 7a and 7b indicates the rate of turning of the vehicle, and provides an additional curve-correction signal that improves the accuracy of tracking.

The frequency-difference apparatus provides almost immediate information about a turn of the vehicle, which quickly introduces a correction signal into the steering control system. No manual adjustment or other operator intervention is necessary.

Where the rows of corn are straight a difference in right-hand and left-hand plant frequencies is an early indication of a turning of the vehicle, which shortly thereafter could either cause a deviation from the optimum path 4 or correct a deviation by returning to the path 4. Thus the turning-rate signal assists the control system in tracking the plant rows accurately even when the rows are straight.

Benefits of Turning Feedback When On Curved Rows

Figure 5:
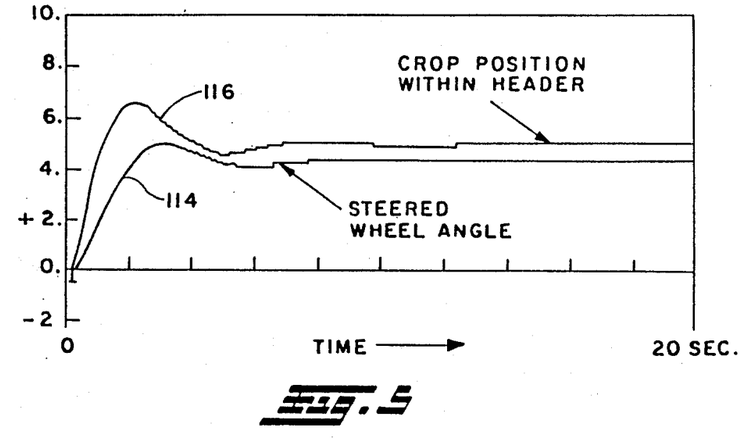
FIG. 5 is a position-vs-time graph showing simulated performance of a guidance system as a crop vehicle goes around a curve, when the system has no curve-correction equipment.
Figure 6:
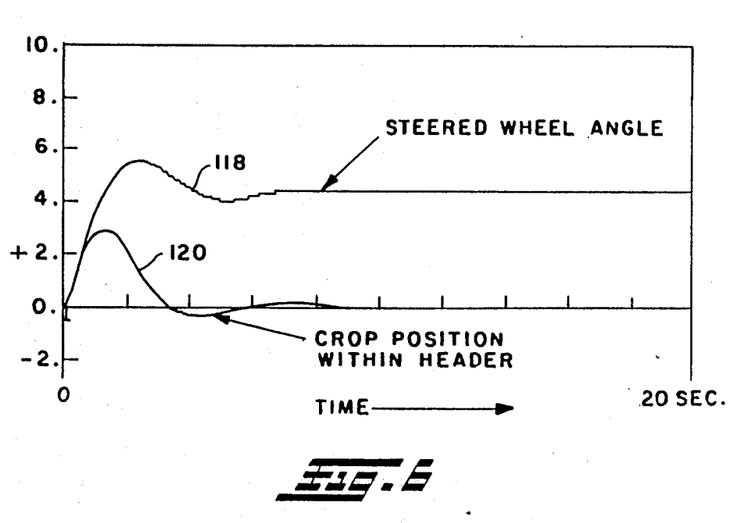
FIG. 6 is a similar position-vs-time graph showing simulated performance on a curve of the invented system, which has curve-correction equipment.

FIG. 5 and FIG. 6 are "before and after" curves showing a beneficial effect of the curve-correction capability. In FIG. 5 the angular position of the steered wheel 53 is plotted as a function of time, as curve 114. The FIG. 5 graph was obtained from a computer simulation of the guidance system, but without the invented curve-correction capability. The vehicle was assumed to be tracking along a straight segment of rows, and to arrive at time zero at a turn of the rows. The rows became off-center in the V-guides, producing error signals, and the steered wheel was automatically turned accordingly, to attempt to continue tracking the rows. The crop position within the V-guides is shown as curve 116. Note that in FIG. 5 the crop position became offset from zero (centered) and remained offset; this offset represents error, i.e., poor tracking. The gain of the feedback loop cannot be made great enough to enable the lateral offset error to be much smaller without incurring instability, without the curve-correction capability.

In FIG. 6 the curve-correction capability (based on turning-signal feedback) was provided in the guidance equipment. In this simulation, the vehicle was again traveling along a straight segment of rows, then encountered a curve at time zero. As before, the steered wheel 53 turned in response to lateral position error signals as shown in curve 118. The wheel 53 remained in the turned position throughout the turn.

The crop position within the V-guides is shown as curve 120 (FIG. 6). It exhibits a transient error when the turn starts, but returns to zero offset error after six seconds and remains at zero error throughout the turn. This is because (a) a turning signal was developed at the terminal 112 (FIG. 4), that was fed back to correct the crop position error, and (b) the turning signal made possible a higher stable gain in the feedback loop as a whole, so that negative feedback was able to reduce the error more vigorously.

Comparison of curves 116 and 120 relative to the zero level of the graphs shows the improvement due to the curve-correction capability of the invention.

Summary of Enhanced Curve-Tracking Capability

To summarize, the invented system has improved tracking accuracy even where the crop rows are curved, because (a) there is an additional correction feedback signal and (b) the feedback loop's gain is more effective. There is a principal steering signal from the lateral-position sensors on the V-guides; the turning signal is an additional, corrective, signal.

The "turning feedback" signal feeds back (through the control system) the rate of rotation of the vehicle about a displaced vertical axis. That signal is proportional to the difference between the lineal velocities of the right side and left side of the vehicle.

The loop gain can be made high without causing instability of the loop because the additional "turning feedback" signal stabilizes the loop. It enables the use of a lower loop gain for a given required steering accuracy, or greater accuracy for a given loop gain. With higher gain, the system tracks the rows with smaller error, because even a small lateral error signal is then amplified greatly to produce a large steering correction. Such great amplification would not be possible without the "turning feedback" signal, because the closed loop would not then be stable.

The output of the steering servo system as a whole can be thought of as the rotation rate of the vehicle or the rate of turning of the vehicle on its path, because the angular position of the steerable wheel is being controlled by the feedback system. In this invention, instead of relying solely on the lateral-error signal of the rows of plants with respect to the V-guide sensors to provide an error signal, the rate of rotation of the vehicle with respect to the crop, which is related to the rate of change of that lateral error, is also directly measured physically, and utilized to assist in controlling the steering.

Typical requirements are to be able to track down to a 50 meter radius, at 5 mph, with a 20-inch-wide "window" for each row.

Dropouts

An area where corn plants are absent, perhaps because they did not germinate properly, is called a "dropout". It is desirable that the crop vehicle be able to steer well automatically while it drives a distance of at least two meters where there is a dropout. The problem of sensing dropouts is facilitated by providing two overreaching contact sensors such as sensors 21, 23 at each V-guide 17, 18. The overlapping of their ends ensures that every plant within the span of a V-guide, irrespective of its lateral position therein, is sensed by at least one and sometimes two of the contact sensors.

If a signal is produced by only the left sensor 21 or the right sensor 23 of one V-guide 17, a plant is known to be Present, but offset to the left or right of the V-guide's centerline 49. If the vehicle is accurately aligned with the rows of plants, signals are produced by both the left sensor 21 and the right sensor 23 of the left V-guide assembly 17, and by both sensors of the right V-guide assembly 18.

The fact that all of the corn plants are spaced about the same distance from other plants in the same row (in any one field) provides a oriori information that a corn plant should be sensed at a given location, for example 10 inches away from the previous one. By using this a oriori information the system can if desired detect a drop-out of only one plant. The microcontroller 66 is programmed to do so by determining whether or not a plant was detected within a time interval (window) corresponding to a space interval where a plant would be expected to be found.

Programming of this type is easily done by those of ordinary programming skill. Preferably, the time interval window is generated by starting the window at a time one-half plant cycle after the most recent detection of a plant, and terminating the window one full cycle after it is started. The period of the plant cycle, i.e., the time between deflections, is stored in a shift re9ister. Thus the windows are one period in duration, and out of phase with the deflection pulse train so as to have the pulses occur in the middle of the windows, as determined by the most recent history.

A second successive window starts when the first window ends. Deflection of a sensor during a window interval indicates the presence of a plant. If neither of the contact arms (e.g., 35, 37) of a V-guide is deflected within the predetermined time window, no plant is present. The number of contiguous dropouts is counted by the microcontroller 66. Overlapping of dropouts on the two sensed rows, and a threshold count for dropouts are also provided by the microcontroller, which actuates an alarm for the attention of the operator of the vehicle.

Even when there are dropouts the averaging of plant spacing can be accomplished by the microcontroller 66 in any of several ways. In the preferred embodiment it loads the previous average value in lieu of a measurement, in the cycle in which the dropout occurs. The microcontroller 66 then computes a 10-space average as usual, and provides an output that enables the vehicle to be steered automatically through a dropout. A predetermined limit is imposed that discontinues the loading of average values when it is reached, and alerts the operator.

A double dropout can occur, i.e., corn can be absent at the same time from both the left-hand row 7a and the right-hand row 7b. If the crop vehicle is still in the field the probability is very small of long simultaneous dropouts of both rows. Occurrence of two meters or more of vehicle travel throughout which both rows are dropped out is interpreted by the microcontroller 66 to indicate that the vehicle is out of the field, and an "out-of-field alarm" is sounded.

Programming of the microcontroller 66 to accomplish this is routine. A signal indicating each dropout of plants on the left-hand row can be input to an AND function, and a signal indicating each dropout of plants on the right-hand row can be input to the same AND function. When the AND gate outputs a signal T times (cycles) in uninterrupted succession (where T corresponds to two meters of travel), the "out-of-field alarm is sounded.

Vehicle Entering a Field

Figure 7:
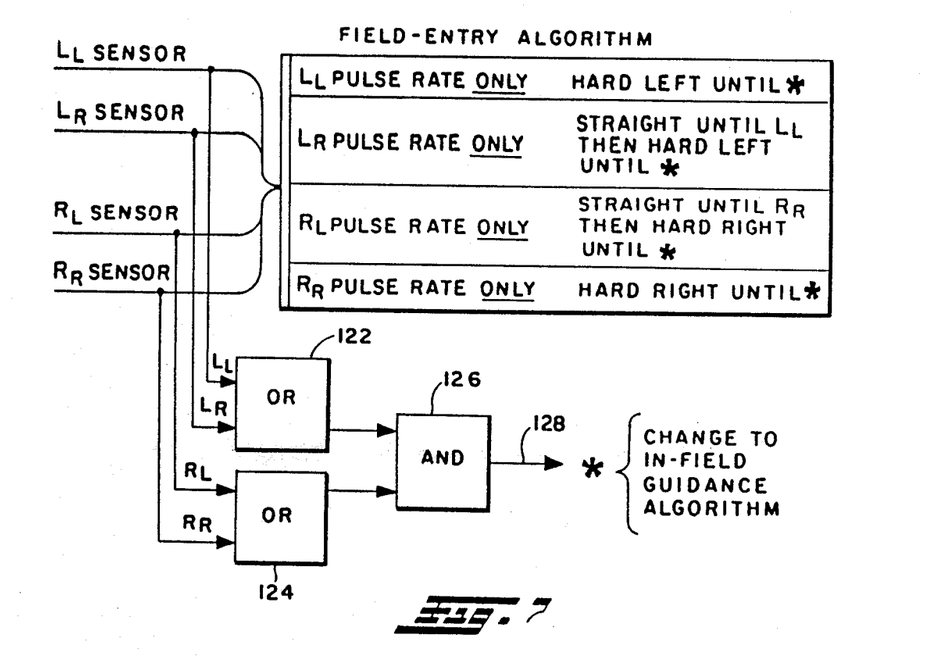
FIG. 7 is a table and logic diagram illustrating operation of an algorithm for acquisition of automatic guidance upon entry of the crop vehicle into a field.

The invented guidance system has the capability of "acquiring" automatic control easily when the vehicle enters a field at speeds up to three mph at as much as a ten-degree angle relative to the direction of the rows. A field-entry algorithm is programmed into the microcomputer 66 for this purpose. FIG. 7 illustrates the functions of the microprocessor 66 in employing the field-entry algorithm. It uses the pulse trains $L_L$, etc. and not the level signals.

When no pulse train comes from any sensor for a predetermined number of seconds the field entry algorithm is enabled, i.e., is alerted to watch for a re-entry. Then, as shown on FIG. 7 and described below, when one sensor starts to produce a pulse train, the vehicle is steered into the field to place the vehicle in the in-field tracking mode of operation.

When the $L_L$ sensor is the only sensor producing a pulse train, the vehicle is automatically steered sharply to the left until it enters the field, as indicated by an "acquisition complete" logic signal. When only the $L_R$ sensor is producing a pulse train, the vehicle is automatically steered straight ahead until the $L_L$ sensor also starts to produce a pulse train, at which time the vehicle is turned hard left until the "acquisition complete" logic signal occurs. Symmetrical algorithms apply for the right-hand sensors.

The conditions for completion of acquisition are shown by the logic diagram of FIG. 7. At least one sensor of the left row 7a must be producing a pulse train, as indicated by an output train from the OR gate 122, AND at least one sensor of the right row 7b must also be producing a pulse train within a predetermine time window, as indicated by an output train from the OR gate 124. An AND gate 126 combines the outputs of gates 122 and 124, and outputs the "acquisition-complete" logic signal at 128, which commands the system to change to the in-field mode of guidance control. If desired, instead the system can change to the in-field mode of guidance control when both (a) the completion signal occurs at terminal 128 AND (b) the steered wheel is essentially straight ahead, within a predetermined tolerance of thresholds.

Parametric Information

A "header" is provided for storing variable parametric information describing the system, in a device that permits it to be conveniently plugged into the control system. It preferably contains only crop-related information, e.g., plant spacing. If, during planting, the plant spacing is altered in some predetermined way at curves, their spacing pattern can be sensed by the V-guide frequency sensors during harvesting, and the data used to determine how sharply the rows are turning. It doesn t matter much whether the plants are planted at equal angular intervals on turns or at equal lineal spacings. With a priori information the relative rate of rotation can be derived from either of those two types of data, but it is simpler if the plants are at equal lineal spacings.

BREADTH

With appropriate modifications the invented system can of course be used as well for various other types of crops. Although a microcontroller utilizing software is employed in the embodiments that are described, the invention can be practiced instead by means of analog or digital hardware without software. Many other variations are also possible within the scope of the inventive concepts. The scope of the invention is determined by the claims.

We claim:

1. A guidance system that automatically steers a vehicle to track rows of spaced-apart plants, comprising:
   first plant-contact sensor means mounted on the vehicle to intercept a row of plants as the vehicle moves, for sensing the position of the row laterally relative to the vehicle and for providing a lateral error signal indicative of said position;
   said first plant-contact sensor means comprising means for sensing individual plants encountered on the rows and for providing signals indicative of the rates of encountering the plants;

at least one additional plant-contact sensor means on the vehicle spaced apart laterally from said first plant-contact sensor means so that it intercepts a different row of plants, for sensing individual plants encountered on its row and for providing signals indicative of the rates of encountering plants;

means for producing a turning-feedback signal based on the difference between the rate at which plants are encountered by said first sensor and the rate at which plants are encountered by said additional sensor;

signal-processing means receiving both said lateral error signal and said turning-feedback signal and responsive to both, for providing steering command signals;

steering-actuator means receiving said steering command signals and responsive thereto for steering the vehicle on a course having a predetermined lateral position relative to said rows.

2. A guidance system that automatically steers a vehicle to track rows of spaced-apart plants and provides an out-of-field signal, comprising:

means for detecting the plants of each of two rows as the vehicle encounters them and for signaling occurrences of the encounters;

means for measuring indicia of the cyclic spacing between neighboring plants and providing data indicative of the spacing accordingly, for each row;

means for detecting that an absence of a plant has occurred, including:

means for establishing, based upon said spacing data, a time-interval window in which a plant would be detected if a plant were present;

means responsive to said means for detecting the plants and responsive to said time-interval window for ascertaining whether or not a plant was detected within that time-interval window and producing a signal indicative of plant presence or absence;

means responsive to plant-absence signals for determining when simultaneous absences occur during overlapping cycles on both rows and for determining when the number of contiguous simultaneous-absences reaches a predetermined number and responsive thereupon to provide an alarm for the operator of the vehicle indicating that the vehicle may be out of the field.

3. A guidance system as in claim 2 and wherein said means for detecting the plants of a row as the vehicle encounters them comprises means contacted by the plants as the vehicle arrives at them and producing signals in response to being contacted.

4. A guidance system as defined in claim 2 and wherein said means for establishing a time-interval window comprises:

means responsive to said data indicative of the cyclic spacing between plants for (a) establishing a window starting-time at a time a fraction of a cycle before the most recent plant encounter and at later times whole cycles apart, and (b) establishing a window stopping-time at a time a fraction of a cycle after the most recent plant encounter and at later times whole cycles apart.

5. A guidance system that automatically steers a vehicle to track rows of spaced-apart plants and steers automatically even through a limited dropout, comprising:

means for detecting the plants of a row as the vehicle encounters them and for signaling occurrences of the encounters;

means for measuring indicia of the spacing between neighboring plants and providing data indicative of the spacing;

means for ascertaining a running average of said spacing data for a predetermined number N of plants, wherein, when a new spacing datum is included in the average the oldest datum is dropped, and for outputting a value signal indicative of said N-fold running average of spacings;

means for detecting that a dropout of a plant has occurred, including:

means for establishing a time-interval window in which a plant would be detected if a plant were present;

means responsive to said means for detecting the plants and responsive to said time-interval window for ascertaining whether or not a plant was detected within said time-interval window;

means for loading a substitute value in lieu of a measured spacing datum when a dropout occurs;

means for counting contiguous occurrences of such loadings of substitute values;

means for discontinuing the substitution process when the occurrences reach a predetermined number M;

whereby said means for ascertaining a running average puts out a value signal even while the vehicle travels through a limited dropout, enabling the vehicle to be steered automatically through the dropout.

6. A guidance system as in claim 5 and wherein said means for detecting the plants of a row as the vehicle encounters them comprises means contacted by the plants as the vehicle arrives at them and producing signals in response to being contacted.

7. A guidance system as defined in claim 5 and wherein said means for establishing a time-interval window comprises:

means responsive to said data indicative of the cyclic spacing between plants for (a) establishing a window starting-time at a time a fraction of a cycle before the most recent plant encounter and at later times whole cycles apart, and (b) establishing a window stopping-time at a time a fraction of a cycle after the most recent plant encounter and at later times whole cycles apart.

8. A guidance system as in claim 5 and wherein said means for loading a substitute value comprises means for storing and loading an average value of a plurality of previous values in lieu of a measured spacing datum when a dropout occurs.

9. A guidance system as in claim 5 and further comprising means responsive to said occurrence-counting means for providing a dropout indication for the operator of the vehicle when a predetermined number of contiguous dropouts occurs.

10. A guidance system that automatically guides a vehicle to track rows of spaced-apart plants and automatically initiates automatic guidance of the vehicle when it enters a field of plants, comprising:

(A) means defining the lateral span of a left-hand sector of the vehicle that extends across a left-hand row of plants as the vehicle moves to enter a field, said left-hand sector including within it a left-hand subsector and a right-hand subsector;

sensor means for sensing the arrival of a plant within said left-hand sector and left-hand subsector and for providing a signal $L_L$ indicative of said arrival;

sensor means for sensing the arrival of a plant within said left-hand sector and right-hand subsector and for providing a sign $L_R$ indicative of said arrival;

(B) means defining the lateral span of a right-hand sector of the vehicle that is spaced apart from said left-hand sector and that extends across a right-hand row of plants, said right-hand sector including within it a left-hand subsector and a right-hand subsector;

sensor means for sensing the arrival of a plant within said right-hand sector and left-hand subsector and for providing a signal $R_L$ indicative of said arrival;

sensor means for sensing the arrival of a plant within said right-hand sector and right-hand subsector and for providing a signal $R_R$ indicative of said arrival;

(C) means for, when only said $L_L$ signal is present, steering hard left until initiation of automatic guidance is detected;

means for, when only said $L_R$ signal is present, steering straight ahead until a $L_L$ signal starts, then for steering hard left until initiation of automatic guidance is detected;

means for, when only said $R_L$ signal is present, steering straight ahead until a $R_R$ signal starts, then for steering hard right until initiation of automatic guidance is detected;

means for, when only $R_R$ signal is present, steering hard right until initiation of automatic guidance is detected;

(D) means for detecting when initiation of automatic guidance is complete, comprising logic means for detecting when at least one of the $L_L$ and $L_R$ signals is present AND at least one of the $R_L$ and $R_R$ signals is present.

11. A guidance system that automatically steers a vehicle to track rows of spaced-aprt plants, comprising:

means for sensing the lateral locations of the rows relative to the vehicle and providing lateral information signals based thereon;

spaced-apart means on the vehicle contacting the plants for sensing the difference in the velocities at spaced-apart plant rows and providing feedback signals, said feedback signals being affected by the angular rate of turning of the vehicle;

steering command means receiving said lateral information signals and said feedback signals and responsive thereto to provide command signals for steering the vehicle to follow a course tracking said rows;

steering-actuator means receiving said command signals, and responsive thereto for steering the vehicle.

12. A guidance system that automatically steers a vehicle to track a right-hand row and a left-hand row of spaced-apart plants, comprising:

plant-contact sensor means on the vehicle for sensing plants that the sensor means encounter and for providing plant-indicating signals thereupon;

means utilizing said plant-indicating signals for providing lateral-position information signals indicating the lateral position of the plants relative to the vehicle;

means utilizing said plant-indicating signals for providing frequency-difference information signals regarding the difference between the frequency of encountering plants at the right row relative to that of the left row, to ascertain the rate of change of the vehicle's heading;

means receiving at least said lateral-position information signals and said frequency-difference information signals, and responsive thereto for providing steering command signals;

steering-actuator means receiving said steering command signals and responsive thereto for steering the vehicle to track said rows.

* * * * *